J. M. DENNING.
TRACTOR.
APPLICATION FILED SEPT. 4, 1915.
1,207,875.
Patented Dec. 12, 1916.
4 SHEETS—SHEET 1.
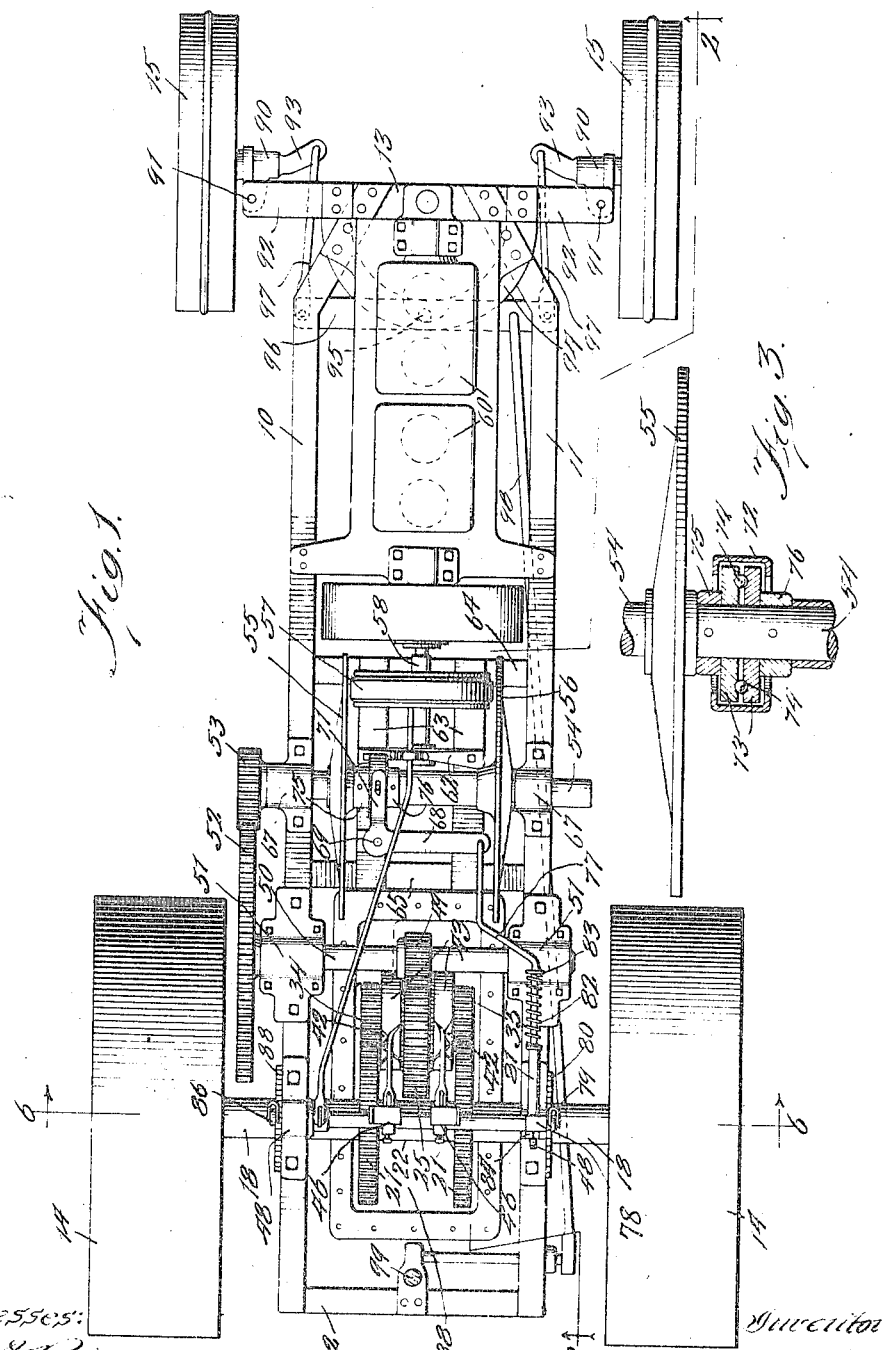

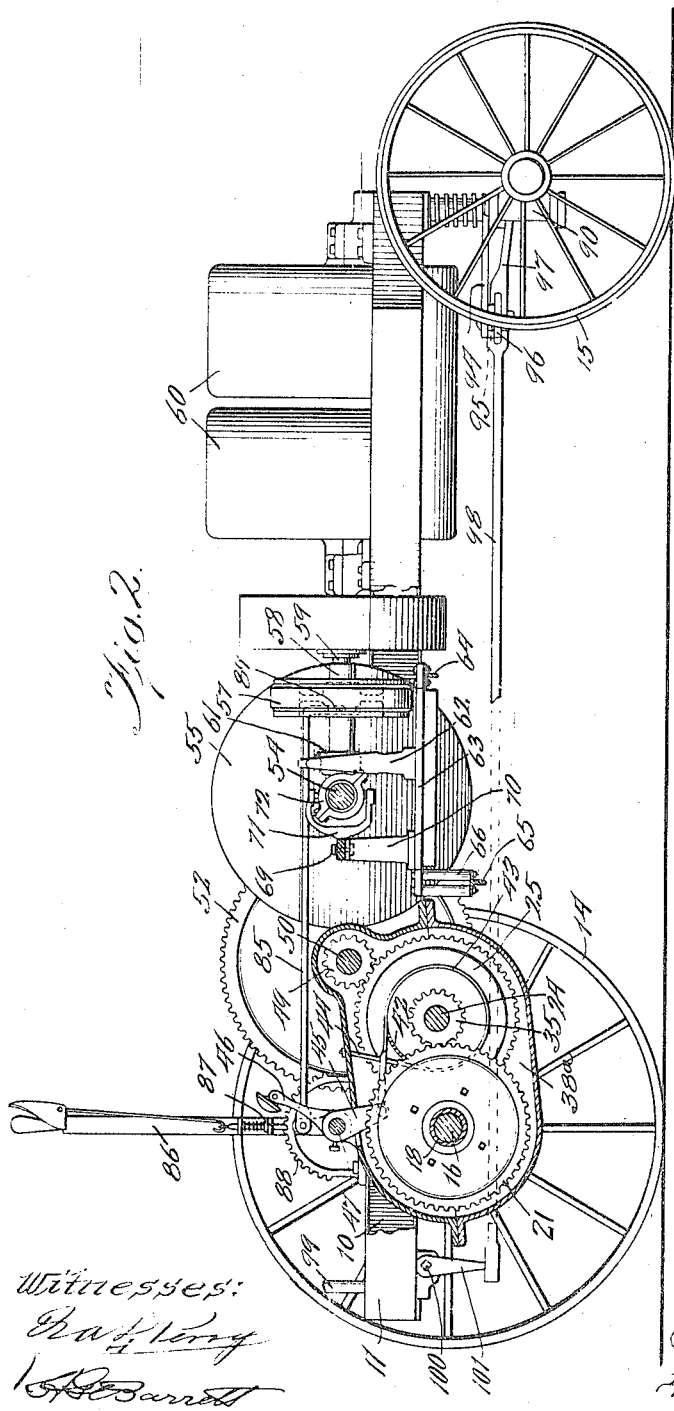

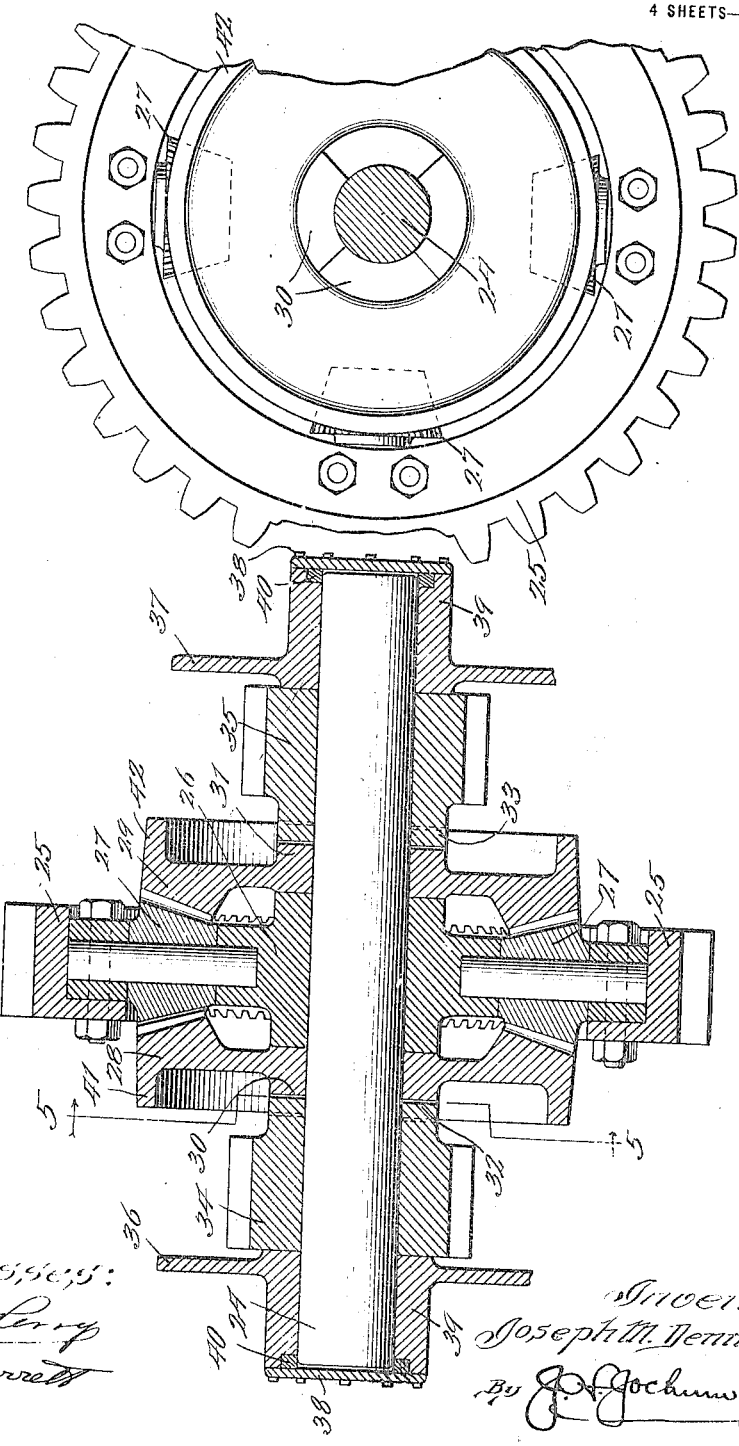

J. M. DENNING.
TRACTOR.
APPLICATION FILED SEPT. 4, 1915.
1,207,875.
Patented Dec. 12, 1916.
4 SHEETS—SHEET 4.
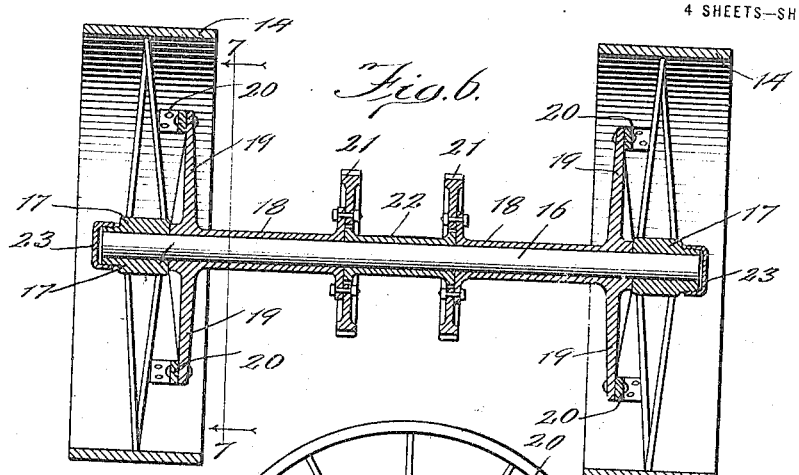
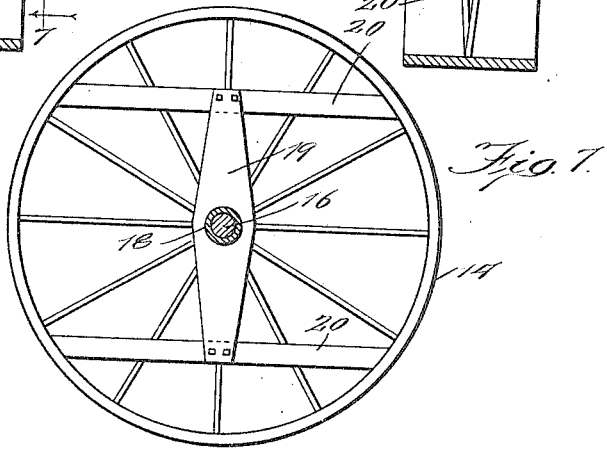
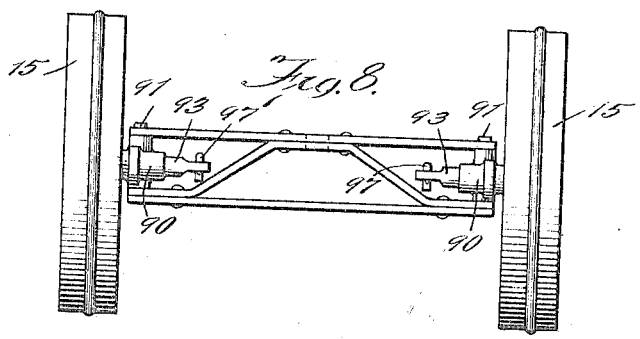

UNITED STATES PATENT OFFICE.

JOSEPH M. DENNING, OF CEDAR RAPIDS, IOWA.

TRACTOR.

REISSUED

1,207,875.

Specification of Letters Patent.   Patented Dec. 12, 1916.

Application filed September 4, 1915.   Serial No. 49,099.

*To all whom it may concern:*

Be it known that I, JOSEPH M. DENNING, a citizen of the United States, residing at Cedar Rapids, in the county of Linn and State of Iowa, have invented certain new and useful Improvements in Tractors, of which the following is a specification.

This invention relates to improvements in tractors, and one of the objects of the invention is to simplify the construction of the driving mechanism and to provide improved means whereby the driving power is applied to the wheel rims, thereby relieving the hubs and spokes of the wheels from all driving strain.

A further object is to provide an improved structure of this character and whereby all connection or key fastenings between the wheel and gear shafts and associated parts are dispensed with, thereby rendering it possible to remove the shafts independently of and without dismantling the other parts.

Heretofore it has been common practice to drive the tractor wheels by means of gears built in the tractor wheels and which gears are driven by pinions on the outer end of the jack shaft. The gears being arranged in the traction wheels renders it impossible to protect them from the dirt and grit that is stirred up by the traction wheels, and in order to overcome these objections and difficulties, the gears in the present invention are placed in such a position where they may be covered and protected from the dirt and grit.

To the attainment of these ends and the accomplishment of other new and useful objects as will appear, the invention consists in the features of novelty in substantially the construction, combination and arrangement of the several parts hereinafter more fully described and claimed and shown in the accompanying drawings, illustrating the invention, and in which:

Figure 1 is a top plan view of an improved tractor of this character constructed in accordance with the principles of this invention and with parts removed. Fig. 2 is a view partly in side elevation and partly in longitudinal section and as taken on line 2—2, Fig. 1. Fig. 3 is a view partly in plan and partly in horizontal section, showing the manner of shifting the friction disks. Fig. 4 is a vertical sectional view of the differential gearing and brake drum. Fig. 5 is a view taken on line 5—5, Fig. 4. Fig. 6 is a vertical sectional view taken on line 6—6, Fig. 1 and showing the manner of applying the power to the traction wheels. Fig. 7 is a view taken on line 7—7, Fig. 6. Fig. 8 is a front elevation of the steering mechanism.

Referring more particularly to the drawings, the numerals 10 and 11 designate the side members and 12, 13 the end members of a supporting frame, which may be of any desired size and configuration and constructed of any suitable material, and this frame is itself supported by traction wheels 14 located at the rear end thereof and the steering wheels 15 at the forward end. These traction wheels are rotatably supported upon a shaft 16, about which the hubs 17 of the wheels rotate, and sleeves 18 are also rotatable about the shaft 16. Connected with and extending laterally beyond each of the sleeves 18 are arms 19, and these arms are bolted to braces or cross bars 20, which latter are secured to the rims of the respective wheels 14. Secured to each of the sleeves 18 is a gear 21, which may be of any desired size, and these gears as well as the sleeves 18, are held spaced from each other by means of a spreader 22, preferably in the form of a sleeve which is detached from the gears and which also rotates about the shaft 16. The traction wheels are secured to the frame of the structure by means of suitable bearings, (not shown) and in which bearings the sleeves 18 rotate.

The shaft 16 is a full floating shaft and is adapted to be removed or inserted into the hubs 17, and sleeves 18, 22, without dismantling any of the parts, the shaft serving the purpose of alining these parts. With this construction it will be manifest that when power is applied to the gears 21 to rotate the traction wheels 14, the driving strain will be applied directly to the rims of the wheels and with the result that the hub 17 and spokes of the wheels 14 will be relieved of all driving strain.

The shaft 16 may be held against longitudinal displacement in any suitable manner but preferably as shown in the present form of the invention, caps 23 are provided which have detachable engagement with the outer faces of the hubs 17, so that when it is desired to remove the shaft 16, for any purpose, all that is necessary is to remove the caps 23. With this construction it will also be manifest that all connections in the way of keys or fastening devices between the traction wheels and the shaft 16 are dispensed with, thereby materially lessening the cost of manufacture and facilitating the assembling of the parts.

The differential gearing which drives the gears 21, constitutes the subject matter of a separate application, but is here specifically described and more clearly shown in Fig. 4 for the purpose of conveying a full and clear understanding of the operation of the machine. This gearing is mounted upon a shaft 24, commonly known as a "jack shaft" and the gearing preferably comprises a ring gear 25, and constitutes the driving member. This ring gear is secured to a spider 26, also rotatably supported by the shaft 24. Rotatably supported by the spider 26 are a plurality of bevel pinions 27, preferably four in number, which rotate with the spider about the shaft 24, and also independently with respect to the spider on an axis arranged transversely to the axis of rotation of the spider. These bevel pinions 27 mesh with bevel gears 28, 29 arranged on each side of the spider 26 and rotate about the shaft 24. Each of the gears 28, 29 is provided with jaws 30, 31 on their outer faces of their hubs, and with which jaws, coöperating jaws 32, 33 carried by pinions 34, 35 mesh. These pinions 34, 35 are also rotatably supported by the shaft 24 and the jaws on the pinions are held in contact with the jaws on the bevel gears by means of the walls 36, 37 of the gear casing 38ª.

The pinions 34, 35 respectively mesh with one of the gears 21, and which latter gears are independent of each other. The shaft 24 is held against longitudinal displacement in any suitable manner preferably by means of caps 38, which are secured to the bearings 39 in which the shaft is journaled, and gaskets 40 may be provided to form a fluid tight connection or joint between the cap and bearing so that the gear casing 38ª will be liquid tight, thereby rendering it possible to fill the casing with lubrication in which the gears rotate.

The gear 28 is provided with a flange 41 and the gear 29 is provided with a flange 42, the periphery of which is preferably arranged in line with the bottom of the teeth of the respective gears and form brake drums around each of which a brake band 43 extends. These bands preferably encompass the respective surfaces 41, 42, and one end of each of the bands is anchored by means of an anchoring device 44, secured to a fixed support while the other end of each of the bands is connected with an arm 45 on a treadle 46, the latter being pivotally connected by means of a shaft 47, mounted in suitable bearings 48 secured to the supporting structure and preferably above the shaft 16, so that by the operation of one or the other of the treadles 46, the brake will be applied to the respective gears 28, 29 to assist in steering the machine, in a manner to be hereinafter set forth.

Meshing with the gear 25 is another gear 49, which is connected with a shaft 50, rotating in suitable bearings 51, and secured to this shaft is a gear 52, which latter is preferably located outside of the gear casing 38, while the gear 49 is located within the gear casing.

The gear 52 is rotated by means of a gear 53 secured to a shaft 54 and connected with which shaft 54 are two friction drive members 55, 56 which are opposed to each other, and disposed between the element 55, 56 is a friction wheel 57, the latter being secured to a shaft 58, which in turn is secured in any suitable manner to the shaft 59 of the motor 60. The free end of the shaft 58 is rotatably supported in a suitable bearing 61 supported preferably by means of an upright 62, the latter being in turn supported upon a sub-frame, preferably comprising spaced members 63, supported by cross members 64, 65, the latter being secured to the main frame. The cross member 65 is preferably disposed lower than the member 64 with respect to the main frame and arranged between the member 65 and the member 63 are uprights 66. This cross member 65 being arranged at a lower elevation is for the purpose of clearing the element 55 and gear 52.

The friction elements 55, 56 are rotated by means of the friction driving element 57 contacting with one or the other thereof and the direction of rotation of the shaft 54 and gear 53 is controlled by the respective elements 55, 56, by shifting one or the other thereof into and out of engagement with the friction element 57, as is well known.

The shifting movement of the disks 55, 56 may be accomplished in any desired or suitable manner. The specific construction of the disk shifting means constitutes the subject matter of a separate application, but is here described and shown more clearly in Fig. 3, for the purpose of giving a full and clear understanding of the operation of the machine.

The shaft 54 is rotatably supported in the bearings 67 and is also adapted to be shifted longitudinally in said bearings, so as to move one of the disks 55, 56 into engagement with the element 57, and the other out of engagement therewith.

A bell crank lever 68 is pivotally supported as at 69 upon a suitable support 70, the latter preferably being supported by the sub-frame, and the arm 71 of the bell crank is preferably bifurcated so as to stand astride of the member 72 of a roller bearing which is connected with the shaft 54. This roller bearing preferably comprises spaced members 73 between which the rollers 74 are arranged and one of the members 73 contacts with a collar 75 secured to the shaft 54, while the other member 73 contacts with a collar 76 secured to the shaft so that when the bell crank lever 68 is rocked in one direction to correspondingly shift the shaft 54, the respective member 73 will engage its collar on the shaft 54 to shift the latter, and when moved in the opposite direction friction will be created between the other member 73 and the respective collar.

The width of the gears 52, 53 is such with respect to each other that they will always remain in mesh during the shifting of the disks 55, 56. Connected with the other arm of the bell crank lever 68 is an operating rod or bar 77, and this bar in turn is connected with a shifting lever 78, preferably loosely mounted upon the shaft 47, the lever being provided with the ordinary pawl 79 and ratchet segment 80. The bar 77 has a sliding engagement with the lever 78 and passes through a tubular element 81, which latter abuts a spring 82 and the spring in turn abuts a collar 83 fast on the rod 77, a stop nut 84 being also connected with the rod on the opposite side of the lever 78. Thus when the lever 78 is rocked, for instance, in a forwardly direction with respect to Fig. 1, the tubular member 81 will force the spring 82 against the shoulder 83 on the rod 77 and the latter will be moved to shift the bell crank lever 68 about its pivot to move the shaft 54 in one direction and with respect to the disks 55, 56. The spring 82 is provided for the purpose of permitting an even pressure of the disks 55, 56 against the friction driving element 57. When it is desired to shift the shaft 54 in the opposite direction, the lever 78 is correspondingly moved as will be understood.

The speed of the machine is controlled by the position of the friction driving element 57 with respect to the axis of rotation of the disks 55, 56 and in order to thus vary the position of this element 57 with respect thereto, it is adapted to be shifted longitudinally on its shaft 58. This is accomplished by reason of the fact that the element 57 has a sliding engagement with respect to the shaft, and a rod 85 is provided for this purpose. This rod is connected at one end with a shifting lever 86 having a dog 87 connected therewith which coöperates with a ratchet segment 88. The other end of the rod 85 is provided with the usual yoke construction, the arms of which engage in a grooved portion 89 in the hub of the driving element 57, so that the position of the element 57 with respect to the disks 55, 56 may be controlled at the will of the operator by shifting the lever 86.

The steering mechanism for the front wheels constitutes the subject matter of a separate application but is here shown and described in order to convey a full and clear understanding of the complete machine and the operation thereof.

The steering wheels 15 are pivotally connected with the forward end of the supporting structure, preferably by means of the bearings 90 in which the axles of the wheels rotate and these bearings 90 are pivotally connected as at 91 preferably to extensions 92, on the front bar 13, so that the bearings will move on upright pivots. The bearings are provided with extensions 93, which are preferably bent forwardly with respect to the bearing and to the wheels. Pivotally connected to a member 94, secured to the main frame and intermediate its ends as at 95, is a bar or rod 96, which is arranged parallel with the bar 13 and mounted upon this bar 96 and each of the extensions 93 is a link 97, each link being pivotally connected to the respective extensions 93 and the bar 96. When the bar 96 is moved about its pivot, preferably by means of a rod 98 which is connected thereto, the wheels 15 will be moved about their pivots. For steering the machine and by the provision of the forwardly bent portions 93, it is possible to give a shorter angle to the wheel taking the inside circle when turning on an angle than heretofore. These wheels when straight are both on the same forward line but when turned to the left or to the right, the wheel taking the inside circle makes a shorter angle than the other wheel, due to the fact that the inside wheel turns on a shorter radius.

Heretofore the common practice of construction of the steering mechanism has consisted in extending an arm backward or forward from each wheel knuckle and connecting the two together by a rod, but should this means be applied to the present invention and the wheels turned at such an abrupt angle as is done by the present construction, the parts of the rod connection would assume positions practically on the center line with the pivotal parts of the knuckles and would lock so that the wheels could not be brought back into position. In the present invention, the connection with the wheels between the pivot 91 and the pivot 95 is in the nature of a toggle lever so that the outer ends of the pivotal bar when swung out of a center line, swing toward the center of the axle and thus carry the end of the connecting rods in toward the center of the axle so that in drawing the wheels back straight, the pull will be on a more direct right angle line with the inner end of the axle spindle, without pulling against the axis of the axle, as would be the case if the rods were on a straight line in the machine, and also because the rod pulls practically sidewise rather than pull back on a substantially straight line with the machine.

The rod 98 may be shifted in any suitable manner preferably from a steering post 99 arranged in a convenient position for the operator and which post is connected in any suitable manner such as by means of a worm gear connection (not shown) with a rock shaft 100, and to which shaft is connected and arm 101 which in turn is connected with the rod 98.

The brake bands 43 and the surfaces 41, 42 of the respective gears 28, 29 with which the bands coöperate, work independently of each other, and they in turn coöperate with the steering mechanism just described, in making short turns.

When the front wheels are turned at a short angle, they would slide considerably with respect to the ground, as a result of the forward push of the tractor, if some means were not provided for helping the wheel to make the turn. It is therefore for this purpose that the two independent brakes are used. If the front wheels are turned shortly to the right, the right hand foot brake is applied, so as to brake the right hand side of the differential. This will throw more of the power to the left hand side of the differential, thus applying more power to the left hand steering wheel which helps to throw the tractor around to the right in conformity to the turn of the front wheels.

While the preferred form of construction has been herein shown and described, it is to be understood that many changes may be made in the details thereof, without departing from the spirit of this invention.

What is claimed as new is:

1. Propelling mechanism for tractors, and the like, embodying a traction wheel, an axle upon which the wheel is loosely mounted, a driven element separate from the wheel and disposed adjacent the axis of the wheel, means connecting the said element with the rim of the wheel, and a driving element to the movement of which latter the driven element is responsive.

2. Propelling mechanism for tractors and the like, embodying a traction wheel, a driven element separate from the wheel and arranged adjacent the hub of the wheel, a driving element to the movement of which the driven element is responsive, and means other than the hub and spokes of the wheel for imparting the movement of the said driven element directly to the rim of the wheel.

3. Propelling mechanism for tractors and the like, embodying a traction wheel, a driven element separate from the wheel and arranged adjacent the hub of the wheel, a driving element to the movement of which the driven element is responsive, means other than the hub and spokes of the wheel for imparting the movement of the said driven element directly to the rim of the wheel, and a shaft for alining the parts, said shaft being detached from all of the said parts.

4. Propelling mechanism for tractors and the like, embodying a traction wheel, a shaft upon which the wheel is loosely mounted, a driven element also loosely mounted upon the shaft, means other than the hub and spokes of the wheel, directly connecting the driven element with the rim of the wheel, and means for driving the said driven element.

5. Propelling mechanism for tractors and the like, embodying a driven element separate from the hub and spokes of the wheel, means rigidly connecting the driven element with the rim of the wheel for rotating the wheel, and means for driving the said driven element.

6. Propelling mechanism for tractors and the like, embodying a traction wheel, a shaft about which the wheel rotates, a driven element separate from the wheel and also rotatable about the said shaft, a lateral extension projecting from said element adjacent the wheel, means connecting said extension with the rim of the wheel, and means for driving said driven element.

7. Propelling mechanism for tractors, embodying a traction wheel, a shaft upon which the wheel is rotatably supported, a driven element separate from the wheel, and also rotatably supported upon the shaft, means for rotating said element upon the shaft, and means projecting from the said element, and secured to the rim of the wheel for rotating the wheel, said shaft being adapted to be removed or placed in position while the remaining parts are assembled.

8. Propelling mechanism for tractors and the like, embodying a traction wheel, a shaft about which the wheel rotates, a driven element embodying a sleeve separate from the wheel and rotatable about the shaft, means other than the hub and spokes of the wheel and operatively connecting the said sleeve with the rim of the wheel, for rotating the wheel, a gear connected with the sleeve, and a driving gear meshing with the first said gear.

9. Propelling mechanism for tractors and the like, embodying a traction wheel, a shaft about which the wheel rotates, a driven element embodying a sleeve separate from the wheel and rotatable about the shaft, means other than the hub and spokes of the wheel and operatively connecting the said sleeve with the rim of the wheel for rotating the wheel, a gear connected with the sleeve, a driving gear meshing with the first said gear, and means for removably securing the shaft against displacement with respect to the said parts.

In testimony whereof I have signed my name to this specification, in the presence of two subscribing witnesses, on this 31st day of August, A. D. 1915.

JOSEPH M. DENNING.

Witnesses:
N. J. TUTTLE,
J. L. MATTSON.